United States Patent [19]  [11] Patent Number: 5,212,606
Park  [45] Date of Patent: May 18, 1993

[54] DOOR STRUCTURE OF A STILL VIDEO CAMERA

[75] Inventor: Jeong-Se Park, Suweon, Rep. of Korea

[73] Assignee: SamSung Electronics Co., Ltd., Suwon, Rep. of Korea

[21] Appl. No.: 619,996

[22] Filed: Nov. 30, 1990

[30] Foreign Application Priority Data

Nov. 30, 1989 [KR] Rep. of Korea ............... 1989-18089

[51] Int. Cl.[5] ..................... G11B 17/02; G11B 15/675
[52] U.S. Cl. ............................... 360/99.02; 360/96.5; 360/99.06
[58] Field of Search ................. 360/96.5, 96.6, 99.02, 360/99.03, 99.06, 99.07, 137

[56] References Cited

U.S. PATENT DOCUMENTS

| 4,680,654 | 7/1987 | Shibuya | 360/96.5 |
| 4,743,991 | 5/1988 | Akiyama | 360/99.06 |
| 4,785,365 | 11/1988 | Ohkita | 360/99.02 |
| 4,847,711 | 7/1989 | Inoue | 360/96.5 |

Primary Examiner—Robert S. Tupper
Attorney, Agent, or Firm—Robert E. Bushnell

[57] ABSTRACT

A door structure of a still camera, for accommodating loading and unloading of a floppy disk or cassette tape into, and from, the interior of the still camera. An eject knob and a switch for operating a disk or tape deck, are linked with the door frame, when the door frame is in motion. The switch is moved by the eject knob into an operating position.

17 Claims, 2 Drawing Sheets

DOOR STRUCTURE OF A STILL VIDEO CAMERA

TECHNICAL BACKGROUND

The present invention relates to a door structure of a still video camera for loading and unloading a floppy disk or cassette tape.

A conventional door structure of a still camera is linked, while in motion, with a disk deck or cassette deck of a still video camera, which makes the structure too complicated to handle and results in its frequent malfunction.

SUMMARY OF THE INVENTION

It is an object of the present invention to provide a door structure of a still camera that is not linked with the disk deck or cassette deck while the door structure is in motion.

It is another object of the present invention to simplify the door structure of a video camera.

According to the present invention, the door structure of the present invention comprises an eject knob which is linked, while in motion, with the door structure and a switch for operating the deck. The switch is moved by the eject knob into an operating position.

BRIEF DESCRIPTION OF THE ATTACHED DRAWINGS

The present invention will now be described more specifically with reference to the drawings attached only by way of example.

DETAILED DESCRIPTION OF A CERTAIN PREFERRED EMBODIMENT

Figure 1:
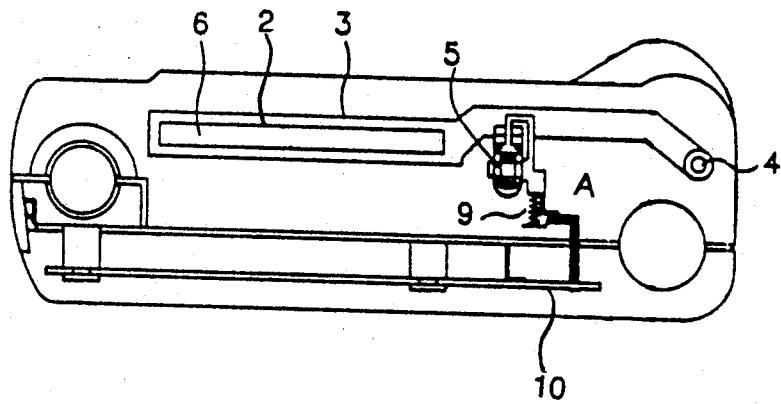
FIG. 1 is a plane view of the essential parts of the inventive structure.
Figure 2:
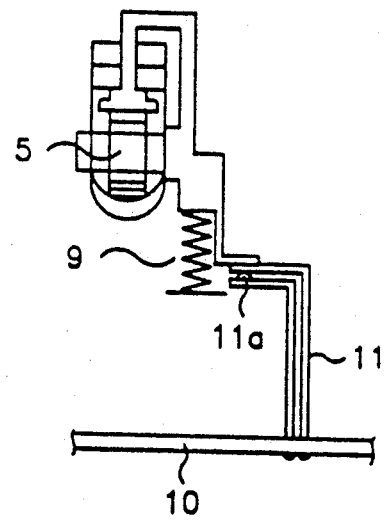
FIG. 2 is an enlarged view of part A of FIG. 1.

Referring now to the drawings, and more particularly, to FIGS. 1 and 2, a door frame 3 is illustrated as mounted around an opening 2, which allows a floppy disk or tape to pass therethrough. The door frame is pivoted on a pin 4. An eject knob 5 is linked, while in motion, with the door frame 3.

Figure 3:
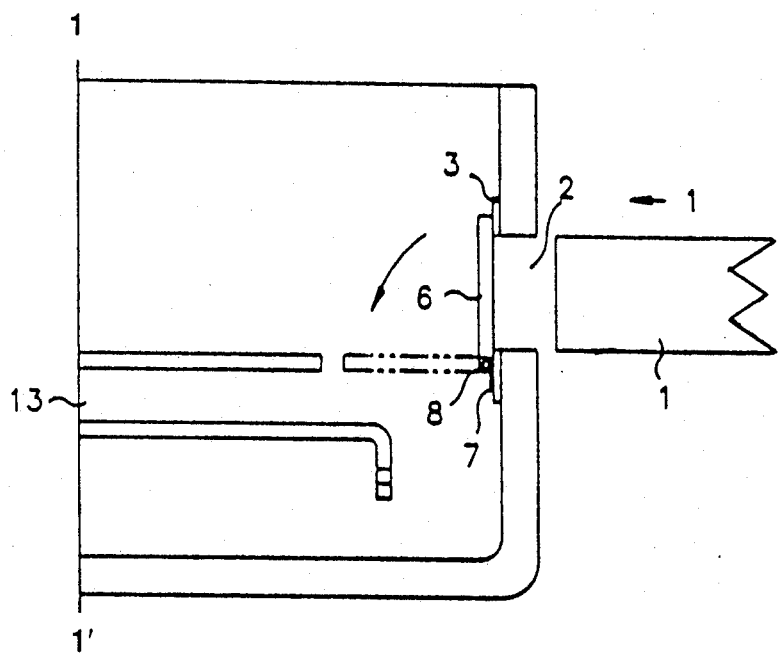
FIG. 3 is a sectional view for illustrating the operation of the door part of FIG. 1.

Turning now to FIG. 3, in conjunction with FIGS. 1 and 2, a door 6 is shown resiliently supported on the frame 3 by a spring 7, pivoting on a pin 8. A leaf switch 11 is arranged on a printed circuit board (PCB) 10. The eject knob 5 has one end resiliently supported on a spring 9, and serves to move the leaf switch 11. The reference numeral 13 represents the deck.

In the operation of the inventive structure shown, if a floppy disk, or a cassette tape cartridge, 1 is to store video signals, the floppy disk, or a cassette tape cartridge, 1 is pushed into the front of the camera body through opening 2 and door 6. The door 6 is then forced opened as door 6 pivots around pin 8. The floppy disk, or cassette tape cartridge, 1 is pushed through opening 2 until the floppy disk, or cassette tape cartridge, 1 is completely loaded into the interior of deck 13. When the floppy disk or cassette tape is completely loaded into the interior of deck 13, the door 6 is again closed by the resilient force of the spring 7 acting upon the door 6. Foreign matter is thus prevented from entering the camera structure by the closure of opening 2 by door 6.

Subsequently, if the floppy disk or cassette tape 1 is to be removed (i.e., to be moved from the interior of deck 13), the eject knob 5 is pushed, slidably moved, by a user (i.e., is placed in motion by the user) to move the door frame 3, thus allowing the opening 2 to pass the floppy disk or cassette tape from the interior of the camera. Meanwhile, the eject knob 5 also moves the leaf switch 11, installed on the printed circuit board 10, into a position for enabling operation of deck 13 by enabling contact with the contact point 11a, so that the deck 13 is driven to push out the floppy disk. After completing removal of the floppy disk, or the cassette tape, 1 when the eject knob 5 is released, spring 9 forces eject knob 5 to return to its original position, and the door frame 3 again moves to close the opening 2.

The present invention simplifies the door structure and results in a more reliable camera body.

What is claimed is:

1. A door structure of a still video camera enabling loading and unloading of a floppy disk or a tape cassette, said door structure comprising:

an opening accommodating passage of said floppy disk or said tape cassette through said opening;

a first pin;

a second pin;

a first spring;

a second spring attached to said second pin;

a door frame mounted around said opening, said door frame pivoting on said first pin toward and away from said opening;

an eject knob connected to said door frame and said first spring, for moving said door frame away from said opening when said eject knob is moved from a first position to a second position and urged toward said first position by said first spring;

a door supported and pivoted on said door frame by said second pin, said door pushed open when said floppy disk or said tape cassette enters through said door frame and urged shut by said second spring; and a leaf switch having an end resiliently supported by said first spring, positioned to be operationally engaged by motion of said eject knob from said first position to said second position, for enabling ejection of said floppy disk or said tape cassette from the still video camera through said opening.

2. A door structure of a still video camera enabling loading and unloading a data memory medium, said door structure comprising:

a door frame mountable on the camera to define an opening accommodating passage of said data memory medium through said door frame and into the camera;

means supported by said door frame, for having a first position enabling said passage through said opening when said data memory medium enters through said door frame;

resilient means for urging said means supported by said door frame into a second position where said means supported by said door frame closes said opening to said passage;

means for enabling ejection of said data memory medium, connected to said door frame and said resilient means and urged from a first position toward a second position by said resilient means, for imparting motion to said door frame away from said opening when said enabling means is moved by a user of the camera in order to allow said data memory medium to be ejected from the still video camera; and switching means having an end urged into a first state of electrical conduction by said resilient means, and positioned to be converted into a second state of electrical conduction by motion of said enabling means in order to initiate ejection of said data memory medium from the still video camera.

3. The door structure of claim 2, wherein said door frame is further comprised of:

a first pin disposed to pivotally connect said door frame to the camera; and a second pin positioned to pivotally couple said means supported by said door frame to said door frame.

4. The door structure of claim 2, wherein said resilient means is further comprised of:

first biasing means connected to said enabling means, for counteracting said motion of said enabling means after said enabling means is moved from said second position to said first position; and second biasing means connected to said door frame and means supported by said door frame, for resiliently urging said means supported by said door frame, toward said second position.

5. The door structure of claim 2, wherein said resilient means is further comprised of:

first biasing means connected to said switching means, for urging said switching means into one of said first state of electrical conduction and said second state of electrical conduction; and second biasing means connected to said door frame and said means supported by said door frame, for resiliently urging said means supported by said door frame, toward said second position.

6. The door structure of claim 2, wherein said resilient means is further comprised of:

first biasing means connected to said enabling means and said switching means, for counteracting said motion of said enabling means after said enabling means is moved from said second position to said first position, and for urging said switching means into one of said first state of electrical conduction and said second state of electrical conduction; and second biasing means connected to door frame and said means supported by said door frame, for resiliently urging said means supported by said door frame, toward said second position.

7. The door structure of claim 3, wherein said resilient means is further comprised of:

first biasing means connected to said enabling means, for counteracting said motion of said enabling means after said enabling means is moved from said second position to said first position, whereby said door frame pivots about said first pin, away from said opening, to allow said data memory medium to be ejected from the still video camera; and second biasing means connected to said door frame and said means supported by said door frame, for resiliently urging said means supported by said door frame, to pivot about said second pin and toward said second position.

8. The door structure of claim 3, wherein said resilient means is further comprised of:

first biasing means connected to said switching means, for urging said switching means into one of said first state of electrical conduction and said second state of electrical conduction; and second biasing means connected to said door frame and said means supported by said door frame, for resiliently urging said means supported by said door frame, to pivot about said second pin and toward said second position.

9. The door structure of claim 3, wherein said resilient means is further comprised of:

first biasing means connected to said enabling means and said switching means, for counteracting said motion of said enabling means after said enabling means is moved from said second position to said first position, whereby said door frame pivots about said first pin, away from said opening, to allow said data memory medium to be ejected from the still video camera, and for urging said switching means into one of said first state of electrical conduction and said second state of electrical conduction; and second biasing means connected to said door frame and said means supported by said door frame, for resiliently urging said means supported by said door frame, to pivot about said second pin and toward said second position.

10. A door structure of a still video camera enabling loading and unloading a data memory medium, said door structure comprising:

a door frame mountable on the camera to define an opening accommodating passage of said data memory medium through said door frame and into the camera;

means supported by said door frame, for having a first position enabling said passage through said opening when said data memory medium enters through said door frame, and a second position closing said opening to said passage;

means for enabling ejection of said data memory medium, connected to said door frame, disposed to undergo movement from a first position and toward a second position for imparting motion to said door frame away from said opening in order to allow said data memory medium to be ejected from the still video camera, in response to operation of said enabling means by a user of the camera; and switching means positioned to maintain a first state of electrical conduction while said enabling means is in said first position, and to provide a second state of electrical conduction in response to said movement by said enabling means toward said second position in order to initiate ejection of said data memory medium from the still video camera.

11. The door structure of claim 10, wherein said door frame is further comprised of:

a first pin disposed to pivotally connect said door frame to the camera; and a second pin positioned to pivotally couple said means supported by said door frame to said door frame.

12. The door structure of claim 10, further comprised of:

first biasing means connected to said enabling means, for urging said enabling means to return from said second position to said first position; and second biasing means connected to said door frame and said means supported by said door frame, for resiliently urging said means supported by said door frame, from said first position toward said second position.

13. The door structure of claim 10, wherein said resilient means is further comprised of:
- first biasing means connected to said switching means, for urging said switching means into one of said first state of electrical conduction and said second state of electrical conduction, in dependence upon said movement of said enabling means from said first position to said second position; and
- second biasing means connected to said door frame and said means supported by said door frame, for resiliently urging said means supported by said door frame, toward said second position.

14. The door structure of claim 10, wherein said resilient means is further comprised of:
- first biasing means connected to said enabling means and said switching means, for urging said enabling means to return from said second position to said first position, and for urging said switching means into one of said first state of electrical conduction and said second state of electrical conduction, in dependence upon said movement of said enabling means from said first position to said second position; and
- second biasing means connected to said door frame and said means supported by said door frame, for resiliently urging said means supported by said door frame, toward said second position.

15. The door structure of claim 11, further comprised of:
- first biasing means connected to said enabling means, for urging said enabling means to return from said second position to said first position, whereby said door frame pivots about said first pin, away from said opening, to allow said data memory medium to be ejected from the still video camera; and
- second biasing means connected to said door frame and said means supported by said door frame, for resiliently urging said means supported by said door frame, to pivot about said second pin from said first position and toward said second position.

16. The door structure of claim 11, wherein said resilient means is further comprised of:
- first biasing means connected to said switching means, for urging said switching means into one of said first state of electrical conduction and said second state of electrical conduction, in dependence upon said movement of said enabling means from said first position to said second position; and
- second biasing means connected to said door frame and said means supported by said door frame, for resiliently urging said means supported by said door frame, to pivot about said second pin from said first position and toward said second position.

17. The door structure of claim 11, wherein said resilient means is further comprised of:
- first biasing means connected to said enabling means and said switching means, for urging said enabling means to return from said second position to said first position whereby said door frame pivots about said first pin, away from said opening, to allow said data memory medium to be ejected from the still video camera, and for urging said switching means into one of said first state of electrical conduction and said second state of electrical conduction, in dependence upon said movement of said enabling means from said first position to said second position; and
- second biasing means connected to said door frame and said means supported by said door frame, for resiliently urging said means supported by said door frame, to pivot about said second pin from said first position and toward said second position.

* * * * *